United States Patent
Hassenflug

(10) Patent No.: US 7,032,435 B2
(45) Date of Patent: Apr. 25, 2006

(54) LIQUID LEAK DETECTOR AND AUTOMATIC SHUTOFF SYSTEM

(76) Inventor: Brian Edward Hassenflug, 890 Spring St., Oak View, CA (US) 93022

(*) Notice: Subject to any disclaimer, the term of this patent is extended or adjusted under 35 U.S.C. 154(b) by 0 days.

(21) Appl. No.: 10/243,778

(22) Filed: Sep. 16, 2002

(65) Prior Publication Data

US 2003/0066340 A1 Apr. 10, 2003

Related U.S. Application Data

(60) Provisional application No. 60/327,829, filed on Oct. 9, 2001.

(51) Int. Cl.
*G01M 3/26* (2006.01)

(52) U.S. Cl. .............. 73/46; 73/40; 340/603; 340/605

(58) Field of Classification Search .............. 73/40, 73/46; 340/603, 605
See application file for complete search history.

(56) References Cited

U.S. PATENT DOCUMENTS

| | | | |
|---|---|---|---|
| 4,252,088 A * | 2/1981 | Frisby | 340/605 |
| 5,347,264 A * | 9/1994 | Bjorkman | 340/605 |
| 5,655,561 A * | 8/1997 | Wendel et al. | 340/605 |
| 6,025,788 A * | 2/2000 | Diduck | 340/605 |
| 6,147,613 A * | 11/2000 | Doumit | 340/605 |
| 6,186,162 B1 * | 2/2001 | Purvis et al. | 340/605 |
| 6,323,774 B1 * | 11/2001 | Mitchell | 340/605 |
| 6,369,714 B1 * | 4/2002 | Walter | 340/605 |
| 6,404,345 B1 * | 6/2002 | Frasier | 340/605 |
| 6,489,895 B1 * | 12/2002 | Apelman | 340/605 |
| 6,520,003 B1 * | 2/2003 | Fox | 73/40.5 R |
| 6,552,647 B1 * | 4/2003 | Thiessen et al. | 340/605 |
| 2002/0033759 A1 * | 3/2002 | Morello | 340/605 |

* cited by examiner

*Primary Examiner*—Daniel S. Larkin
(74) *Attorney, Agent, or Firm*—J. E. McTaggart

(57) ABSTRACT

A flapper is provided in the main conductive fluid supply inlet line, and a permanent magnet is affixed to the bottom of the flapper. Adjacent to the flapper, outside the pipe, a magnetically operated switch is placed. Conductive fluid sensors are placed in or on conductive fluid dependent appliances, to determine the presence or absence of flowing conductive fluids. The flapper's switch and the conductive fluid sensors are connected in circuit with a relay, which in turn controls an electrically actuated valve cutting off or permitting the entry of fluids from the source to the inlet pipe. If the switch is activated, and one or more of the fluid sensors is not, within a predetermined time period, then the electrically actuated valve will cut off the entry of fluids from the source to the inlet pipe. If the switch and sensors are activated concurrently, normal fluid flow will be permitted.

20 Claims, 7 Drawing Sheets

LIQUID LEAK DETECTOR AND AUTOMATIC SHUTOFF SYSTEM

This application claims the benefit of Provisional Application No. 60/327,829, filed Oct. 9, 2001.

BACKGROUND OF INVENTION

1. Field of Invention

The Invention is generally directed to fluid flow control systems and, more particularly, to a system for preventing unwanted conductive fluid flow, particularly water flow, when ever a break in a conductive fluid line occurs.

2. Description of Related and Prior Art

The damage caused by water leaking from a broken water line in a house or building can be extensive and typically exceeds several thousand dollars per household. Water destroys carpet, drywall, hardwood floors, linoleum floors, etc. and can even cause floor foundation to warp. Water leaking into a home or building also can cause mold to grow in and around your walls and floors. Some of these molds have been known to cause serious medical problems and on rare occasions even death, for those who are exposed to it for an extended period of time. While the present inventor has no specific evidence as to how much water damage occurs in the U.S. alone each year, it is expected to run into the hundreds of millions of dollars annually. Accordingly, a need exists for a system that will minimize the water damage which results when a break in a home or buildings water line occurs. The seriousness of this problem is evidenced by the large volume of patents filed in the US alone.

By way of example U.S. Pat. No. 6,186,162, No. 5,967,171, No. 6,369,714 and No. 6,025,788; all disclose an automatic shut-off device that requires sensors that are placed under or around water dependent appliances, in order to detect water that has leaked from a pressurized water line and has reached the floor. U.S. Pat. No. 4,845,472 provides an apparatus which responds to the sensing of water leakage from a water line of a "hot water" system. U.S. Pat. No. 5,190,069 utilizes a wire embedded in insulation tape carrying leak detecting liquid sensing elements.

U.S. Pat. No. 5,655,561 No. 6,025,788 No. 6,186,162 No. 6,369,714 No. 6,489,895 No. 6,552,647 and US 2002/0033759 A1; all disclose an automatic shut-off device that requires sensors that are placed on floors, under or around water dependent appliances, or in leak prone areas, in order to detect water that has leaked from a pressurized water line and has reached the floor or surface area under a cabinet. These systems are only effective if the leak occurs at the exact location that the water sensor is located. If there were a leak in a cooper line where a fitting became weak and started to leak, these systems would not detect this leak until the (undesired) water level in the house reaches one or more of these sensors for it to shut down the main water supply to the building. By this time, the damage would have been done. If The Building user was to splash liquid of any kind on or around the Sensor, for example, water splashing on the floor in the bathroom from a bathtub or shower and it reaches one of these water sensors that are placed on the floor behind, for example, a water closet, the sensor would then trigger, and ultimately send a signal to shut the main water valve off to the main water supply to the home or building. Another example would be if the Building user was to need to clean the floor surface with a liquid cleaning solution, and the liquid cleaning solution, (for example water and bleach or ammonia) was to come into contact with one of the sensors placed on the floor surface around the water dependent appliance, then the sensor would again ultimately send a signal to prematurely terminate the main water supply to the building, not only prematurely terminating the water supply to the building, but also misleading the Building user that there was a water leak when there was not.

U.S. Pat. No. 6,025,788 also includes a system for detecting Liquid gas leaks, and U.S. Pat. No. 6,552,647 includes a smoke, carbon monoxide & temperature detection as well as water leak detection. U.S. Pat. No. 4,252,088 discloses a system for only monitoring the point of entry of a Water heater to the point of exit of the water heater. This water leak detection system is only valuable if the water heater leaks, and not if there is water leak in any other part of the home of building. U.S. Pat. No. 6,323,774 discloses a system that not only times the water usage from the time it starts moving in the main water supply line, but also counts the gallons used during a normal day. If the water is used for an extensive period of time that is not the usual amount of time, for instance, an extended shower, then the system would then time out, and shut the main water supply to the building off. If the normal days water usage was to increase for some reason, for example, more showers were to take place during a normal day than usual, thereby using more gallons then is normal, the system would then count more gallons then is normally used in a normal day, and then shut off the main water supply to the building as well.

U.S. Pat. No. 5,347,264 discloses a system that includes motion sensors in every room of a home or building, that includes a water dependent appliance. The main water valve on the main water supply line to the building is normally shut off, thereby not allowing water to flow through the main water supply line, and when someone was to enter a room where one of these motion sensors was located, the motion sensor would sense the presence of someone in the room, and the motion sensor would allow the main water valve on the main water supply line to open, therefore allowing water to flow though the main water line to the water dependent appliance if so requested. This system has many different ways of allowing water to flow in undesirable locations. If the building users were present and entering in and out of locations where these motion sensors were located in the building, and there was a leak in a water supply line in a location anywhere in the home or building. The system would allow the leak to continue until the present building user was aware of the leak and shut the main water supply valve off. Or if there was a leak, and the Present user was not to enter any of the rooms where the motion sensors were located for an extended period of time. Every time that the user was to re-enter a room with a motion sensor in it, the motion sensor would then allow the main water valve to open, thus allowing water to flow through the main water supply line, and ultimately to the leak, then leak would then continue, until the user left the room, and or the sensor timed out. This would continue until the present user would discover the leak and shut off the main water valve to the building. If the occupant of the building had an animal, for example, a cat or dog that stayed in the building for any period of time, then if the animal was to enter a room with a motion sensor in it, then the leak would be also allowed to continue leaking until the animal left the room with the motion sensor, and or it timed out. Every time the animal would walk past the motion sensor the water would be allowed to leak in the building until the animal left the presence of the motion sensor, or the motion sensor timed out. U.S. Pat. No. 6,147,613 discloses a system that sensors placed in pans under water dependent appliances, that have level sensors installed in them. If the water level reaches a certain height, then the water system would then shut off the main water supply to the building. It also includes a pipe wrap that includes sensors, that wraps around the main water supply line to the building. If a water pipe leaks, then the sensors in the wrap would detect it and shut off the water supply to the building. Never the less, all of the above mentioned systems are inferior and different from the disclosed invention, which very inexpensively monitors the water system from the point of entry, to the point of disposal, without setting water sensors on the floor around or under water dependent appliances, wrapping the entire water piping system with expensive wrap with sensors built in to it, Installing pans under water dependent appliances with sensors built in to it, timing and counting gallons of water usage, or motion sensors placed in rooms that include water dependent appliances. U.S. Pat. No. 5,229,750 uses a float and solenoid system to control a shut off in the event of a water leak. U.S. Pat. No. 5,632,302 discloses an over flow detection device for use with a water heater. U.S. Pat. No. 6,216,727 discloses an apparatus that starts a preset timer when flow is sensed through the flow sensor. When the flow of liquid has flowed longer that the preset time of the circuit, then the valve will automatically shut off the supply.

U.S. Pat. No. 4,180,088 to Mallet addresses this problem with a water leak detection system which uses a water flow sensing device to shut off a valve on the incoming water line when water flow in the line is detected. The system cannot be used during periods of normal water usage since the water flow which results, for example, when a simple faucet is turned on would activate the system and thereby shut off the supply of water. Accordingly, this system is only realistically useable when the home owner intends to be away from home for an extended period of time or does not expect to use the system, for example at night. However, use of the system at night is not realistic either since most homeowners use bathroom facilities at night. An investigation of this prior art shows that most of the patents, such as U.S. Pat. No. 4,845,472, U.S. Pat. No. 5,428,347, and U.S. Pat. No. 5,655,561 generate audible alarms to signal a detected leak. Of these U.S. Pat. No. 4,845,472, U.S. Pat. No. 5,428,347, and U.S. Pat. No. 5,655,561 additionally disclose the use of solenoid-actuated valves in the water supply line. U.S. Pat. No. 5,229,750 and U.S. Pat. No. 5,632,302 also disclose the use of solenoid-actuated valves to cut off a water supply. U.S. Pat. No. 5,029,605 point out that deposits that accumulate in pipes and valves over a period of time may impede the actuation of solenoid-type valves. Also avoiding the use of solenoid actuated valves is U.S. Pat. No. 5,240,022 which incorporates a ball valve in the water supply line. To hold the ball valve in an open position it is coupled to a rotor and a spring is attached to the rotor exerting a counterclockwise torque on the rotor. The rotor is then locked in a valve-open position by a latching arm. The end of the latching arm contacts a trip arm that receives it's retaining torque from a wire spring. A trip wire actuates the trip arm. This trip wire is a metallic memory alloy wire which contracts when heated. Heating is effected by a circuit actuated by the water detector. As a consequence the latch arm is released and the rotor rotates to a valve-closed position.

U.S. Pat. No. 5,334,973 discloses a ball valve. This valve controls flow into a hot water tank by using a mechanical drive in conjunction with a multiplayer moisture sensor which incases the water tank liner.

U.S. Pat. No. 5,161,563 and its counter part U.S. Pat. No. 5,441,070 which also includes an solenoid-actuated valve, incorporates flap type flow sensors located in the water line in order to sense the flow of water. The main water valve, an solenoid-actuated valve, is a normally closed valve, requires power to open the valve, and only opens when one of the flow/pressure/sensors located at or near an water dependent appliance is activated. When one of the flow/pressure sensors is activated, it sends electrical current to the circuitry to open and "hold open" the "normally closed" solenoid-actuated water valve, thus sending water through the system. This system also has a timed out period and learning periods for each sensor, pressure switches, and temperature sensors as well. This system requires that the water pipes retain its normal water pressure during the time in which the water in not in use, in order for the flow/pressure sensors to trigger when a water dependent appliance is requesting water. If the pressure drops in the system for any reason while the water in not in use, (ie dripping faucet, shower head, running toilet due to a bad flap, etc. . . . ) then when water is requested from a water dependent appliance, the pressure in the water pipes will not be enough to trigger the flow sensor in order to ultimately turn the main water valve "on" and receive water to the water dependent appliance that was requesting it. It states that it "the system also thus periodically replenishes itself to compensate for a small tolerable leaks". This seems to contradict other statements in this patent that states, "this system can sense even small leaks". If water is requested and not received, due to the confusion of what is a "small tolerable leak", there would be no clear sign as to why the water system was not allowing the water valve to open, intern letting water to run through the water pipes to its requested location. A few examples of this are that, the pressure could have dropped due to a faucet drip, shower drip, or etc. . . . Power could have been interrupted to the main water valve, thus making it impossible for it to open, or there could actually be a small or large water leak in the pipe. This system also requires the main water valve to open (and be held open for the duration of the water consumption) every time water is requested, and every time it needed to "replenish itself". This would open and close the main water valve at least dozens of times a day, every day 365 days a year, which would not only consume excessive power, but would also deteriorate the life expectancy of the main water valve, and circuitry tremendously.

U.S. Pat. No. 5,771,920 and No. 5,503,175, also discloses predetermined time and or "timed out" periods before shutting off the water supply to the home or building.

U.S. Pat. No. 5,979,493, No. 6,209,576, No. 5,920,265 disclose timing and or counting the predetermined gallons of water before shutting down the water supply to the home or building.

U.S. Pat. No. 6,317,051 discloses timing the water as well as placing a listening device in the waste pipe in order to hear if there is water running in the waste pipe simultaneously with the running of the water from the potable pressurized water line.

U.S. Pat. No. 5,007,453 discloses a system that also places water sensors at or near the water dependent appliances in order to count the gallons that pass through each sensor, sending the information to the main computer in order to store data from each water dependent appliance so that when that particular appliance requests water, it will start counting gallons until it reaches its usual use of gallons of water for that appliance. If it exceeds that number, it will then shut the water off to the system. Unfortunately, if you decide to shower, water the grass or plants, wash the car, longer than usual, then this system could automatically shut the supply of water off to the house or building prematurely.

Other Patents disclosing apparatus and systems for preventing of shutting off fluid flow are disclosed in U.S. Pat. Nos. 4,735,231; 3,506,033; 2,160,766; 2,012,351; 3,800,827; 1,3173,966; and 1,956,010.

All the abovementioned patents are incorporated herein by reference.

All the aforementioned patents disclose systems for preventing fluid flow in one situation or another, a need still exists for a system which is capable of minimizing the leakage of conductive fluid into a home or building simply and inexpensively at all times, twenty four hours a day, three hundred and sixty five days a year, whether the user is present or away. Including these benefits, but not limited to them, the ability to manually shut down your water supply for whatever reason by pushing a button on the centrally located control panel. Always knowing the status of the system by reading the centrally located control panel. By using a D.C. powered system to not only provide safety, but also to save on power cost. Including the ability of the system to notify the user by way of telephonic communication of a automatic shut down of the water system to the home or building, due to a leak detection, and or the excessive use of water, and also the ability for the user to shut the water supply off to the home by telephonic communication for safety, or for excessive water usage, without using a security service agency, saving time and the monthly charges of that service. Never having to worry about the main water supply valve freezing up, with the automatic valve cycle system built in. Minimal moving parts, to prevent frequent servicing of the system. A system that will also protect freezing water pipes from leaking as well without additional equipment.

Whatever the precise merits, features and advantages of the above cited references, none of them achieve or fulfills the purpose of the disclosed "Conductive Fluid leak detection system and automatic shut off valve", the present invention, and is an improvement over all prior art.

SUMMARY OF INVENTION

The present invention addresses the aforementioned problems by providing a conductive fluid flow supply system that minimizes conductive fluid leakage whenever a leak is detected in a fluid line. In its broadest sense, the object of the present invention is to provides a method for controlling forward conductive fluid flow between a first point (example; water flow sensor out side the home or building) and a second point (water sensors placed in or at the ends of the water dependent appliances) of a pressurized conductive fluid line. The method includes detecting conductive forward fluid flow at the first point and continuing to allow the forward fluids flow to the second point(s), when conductive forward fluid flow at the second point(s) are also detected. (ie; allowing the main water line shut off valve to remain in its "Open" position) The method further includes preventing conductive forward fluid flow (by way of shutting off the main water line valve) at the first point if conductive forward fluid flow is detected at the first point and not detected at the second point(s).

This invention is designed to detect conductive fluid leaks in a pressurized conductive fluid system. One example of this is the water supply to a house or commercial building. This low voltage system is designed to detect the flow of water or any conductive fluid through the main supply to the building.

This is accomplished by a system comprising of (example) a "water flow sensor" located at the main inlet outside the home or building. There are also conductive fluid detecting sensors in or at the end of every water dependent appliance in the building (i.e. faucets, shower heads, toilets, appliances, hose bibs, etc. . . . ) that detect when conductive fluid (water) is present and flowing from the correct and or desired location. This system also comprises an electrically actuated on-off valve located near the "water flow sensor" at the main water inlet just outside building.

The disclosed automated valve comprises a valve that is not a normally open or normally closed solenoid actuated valve. This valve is designed to maintain its open or closed position, without the requirement of electrical power to maintain that position. (Power is required to move from one position to the other, i.e. open or closed)

The circuitry of this invention will be referred to from this point on as the brain(s) of the system. The brain(s) will be placed in a control panel in an easily accessible location in the building. The visible control panel comprises of a panel that will house some or all of the circuitry that runs the system as well as indicating LED's, manual valve open-close, reset button, an all power off button, an automation system off/on button, an numerical keypad, a user number set button, an timer reset button, an digital display panel, and a audible alarm. The LED's are designed to help notify the user of the current system status.

For example; a solid green light could indicate that the system is on, the valve is open, and no leak is detected. A solid red light could indicate that the main valve has been shut off manually, or automatically due to excessive water usage, and not leak detection. A flashing red light could indicate that the system has been automatically shut down due to a detected conductive fluid leak.

The manual open-close reset button could be used as to not only allow the user to manually shut off the fluid supply to make any desired repairs or improvements, but also could allow the user to re-open the valve after an automatic shut off due to a conductive fluid leak detection.

The all power off button could allow the entire system to be turned off, allowing for any desired repairs or adjustments.

The automation system on/off button could allow the user to shut down just the automated portion of the system. This is to allow for the filling of a new water heater or to bleed the fluid lines of air without a premature automated shutdown of the water flow.

The timer reset button(s) could be used to reset the timer(s) that starts, when the water is being requested.

The numerical pad is to be use in conjunction with the user number set button, in order for the user to set and store for example, the phone numbers from which he could be contacted at in case of a automatic shut down of the water supply, or excessive water usage. Or the code that he could store for, an over the phone, manual shut down or re-open of the main water valve to the home or building, and to set the timing modes of said timers.

Use Example 1: In a home, commercial building or apartment complex the water system could work as follows: When water begins to flow in the main water line, the main water line flow sensor, located next to the main shut off valve prior to the supply lines entrance to the home or building, would sense the water's flow, and in turn send a signal to the brain(s) indicating the flow of water. The brain(s) delays while automatically begins looking for a signal from one or more of the moisture sensors located in or at the end of every water dependent appliance in or on the building. These moisture sensors can be hard wired or wireless. If the brain(s) receives a signal from one or more moisture/water sensors, located in or at the end of every water dependent appliance within a designated time period (time delay adjustments can be made from example 0.5 to 5.0 seconds) the system and main water shut off valve will remain in its normal open status and the green light on the panel will remain lit.

If the brain(s) receives a signal from the main water line flow sensor indicating water flow in the main water supply line, and does not receive a signal from one or more of the moisture/water sensors located in or at the end of the water dependent appliances within the designated time period, (example 0.05–5 seconds) the system will automatically send power to shut off the main water shut off valve. This shuts down all water from entering the home or building and keeps any resulting damage to a minimum. A flashing red light then replaces the solid green light, as well as an audible beeping signal indicating the automatic shut down.

This intern would prompt a (user programmed) telephone notifier, to notify the user or building owner, (by way of telephonic communication anywhere in the world) of the automatic shut down of the water system due to a conductive fluid leak detection.

After locating and repairing the leak, the user would turn off the automated portion of the system and reset the main water shut off valve to the open position, redisplaying the solid green light in place of the flashing red light. Next the user would bleed the system of any air, and then return the automated system to normal operating status.

If the user wishes to do repairs or maintenance in the building that requires the water to be shut off, or just wishes to turn the water off while away on an extended vacation, the manual on-off button may be used to turn the main water shut off valve to the off position eliminating the flow of water to the building. This causes a solid red light to be displayed in place of the solid green light.

If the system's main shut-off valve is shut down for any reason, and the main power source is interrupted for any reason, the DC powered main fluid shut off valve would remain closed. As stated earlier, the main fluid shut off valve does not require power to maintain its closed position. The opposite also applies: if the system is operating at normal status and the main power is interrupted, the main fluid shut off valve will remain open allowing normal water usage. It is believed that the conductive fluid leak detection system and automatic shut off valve is the only conductive fluid leak detection device or apparatus that includes this feature.

In addition the system utilizes a battery back up power supply to continue monitoring the water system in the event of an interruption of the main power. While using battery power the system continues to function normally, including shutting off the main fluid shut off valve in the event of a detected leak. Battery life will be dependant upon battery size and individual systems power requirements. The battery power supply is constantly being trickle charged during normal (main) AC powered service, to maintain optimal power and battery life.

The system brain(s) utilizes an internal clock/timer allowing it to track the amount of time between main fluid shut off valve movements. If the valve has not been moved within a designated period of time, the system will automatically close and reopen the main fluid shut off valve, maintaining freedom of movement. The clock/timer will automatically reset itself every time the main fluid shut off valve is closed for any reason, whether it is automatically moved, or manually moved.

In addition the system utilized timer(s) for water conservation purposes. If the water has been running for an (user set) extended period of time, due to a yard sprinkler left on, or a (left on) pressurized garden hose unknowingly ruptures etc. The timer would time out (example; 60 min.) and prompt a distinct audible signal on the control panel to notify the present user of the excessive water use. When the distinct audible signal begins, this prompts another phase of (user set) timing to begin, and when it times out, (example; 15–20 minutes after the distinct audible signal has begun) this will prompt the (user set) telephone notifier to notify the non-present user by way of telephonic communication, of the excessive water usage. When the telephone notifier begins, another phase of (user set) timing starts, and when it times out (example; 15–20 minutes after the phone notifier has prompted) it will automatically turn off the water supply to the home, if no action is taken within that (user set) time period. (such as resetting the timer, terminating the water usage, or shutting down the water supply to the home or building by way of telephonic communication using a user set code, from anywhere in the world) This in turn lights the solid red light replacing the solid green. The water usage timing portion of the system can be reset to start the timing periods over again, (at any time) by pushing the reset button on the visible control panel, in case the user desires the water usage to continue past the (user set) times programmed into the circuitry. It is believed that the conductive fluid leak detection system and automatic shut off valve disclosed is the only fluid leak detection device or apparatus that includes this feature.

In addition the conductive fluid leak detection system and automatic shut off valve system disclosed also utilizes a system for controlling the water system fluid flow, using a (user set) telephonic code, to turn the water to the system off or on from any push button telephone, anywhere in the world. It is believed that the fluid leak detection system and automatic shut off valve disclosed is the only fluid leak detection device or apparatus that includes this feature.

Use example 2: In a larger commercial facility or an apartment complex the system can utilize multiple shut off valves, sensors and a larger control panel (which utilizes a brain and an individual set of switches, buttons and LED's for each unit or building located in an easily accessible area for the management to observe) to isolate and identify multiple portions of a facility or individual apartment units, allowing a leak to be shut off in one unit or building while maintaining normal service to all others. It is believed that the fluid leak detection system and automatic shut off valve disclosed is the only fluid leak detection device or apparatus that includes this feature.

Using the optional phone notifier built into the system, the system can be set to automatically notify the user/management when an automated system shutdown or (user set) excessive water usage has occurred. Phone notifier will alert the user by phone or pager service with a user defined message or numerical code. It is believed that the fluid leak detection system and automatic shut off valve disclosed is the only fluid leak detection device or apparatus that includes this feature.

Use example 3: Any type of conductive fluid system that the user wishes to monitor can utilize the same options as the above examples. (i.e. pipelines, sprinkler and irrigation systems, oil field or chemical lines, and frozen pipes etc. . . .)

In Summary Conclusion I contend that my invention differs from all others in many ways including but not limited to:

1. My electrically actuated valve requires no power source to maintain its open or closed position, as opposed to a solenoid actuated valve which returns to its original position during a loss of power. This results in far greater energy efficiency as well as maintaining the desired open or closed position during an interruption of power.

2. The battery back up allowing for continual system monitoring even in the event of a loss of electrical power.

3. Does not rely on pressure switches, timing fluid usage, floor based moisture sensors, or the counting of gallons to operate.

4. Has hard wired and wireless moisture sensing options.

5. Automatically closes and opens valve(s) at predetermined intervals to maintain freedom of valve movement.

6. Has a control panel to view and operate the system with a touch of a button(s).

7. Monitors the entire fluid system from line entry to all desired fluid exit points.

8. Contacts the user (when the user is away) by way of telephonic communication of a automatic shut down of the main water supply valve due to a water leak detected, without a monthly security company charge.

9. Contacts the user (when the user is away) by way of telephonic communication of excessive water usage, without a monthly security company charge.

10. The option of shutting off the main water shut off valve by way of telephonic communication.

11. A warning audible signal of excessive water usage.

12. A warning beeping audible signal of an automatic water supply shut down, due to a leak.

13. The ability to connect numerous systems together, to monitor an entire apartment complex, by either building by building, or each and every apartment individually.

14. And controls leaks in broken frozen pipes, with out the requirements of additional equipment.

BREIF DESCRIPTION OF THE DRAWINGS

Further objects and advantages of the invention will become apparent from the following description and claims, and from the accompanying drawings, wherein;

DETAILED DESCRIPTION OF THE PREFERED EMBODIMENT

Figure 7:
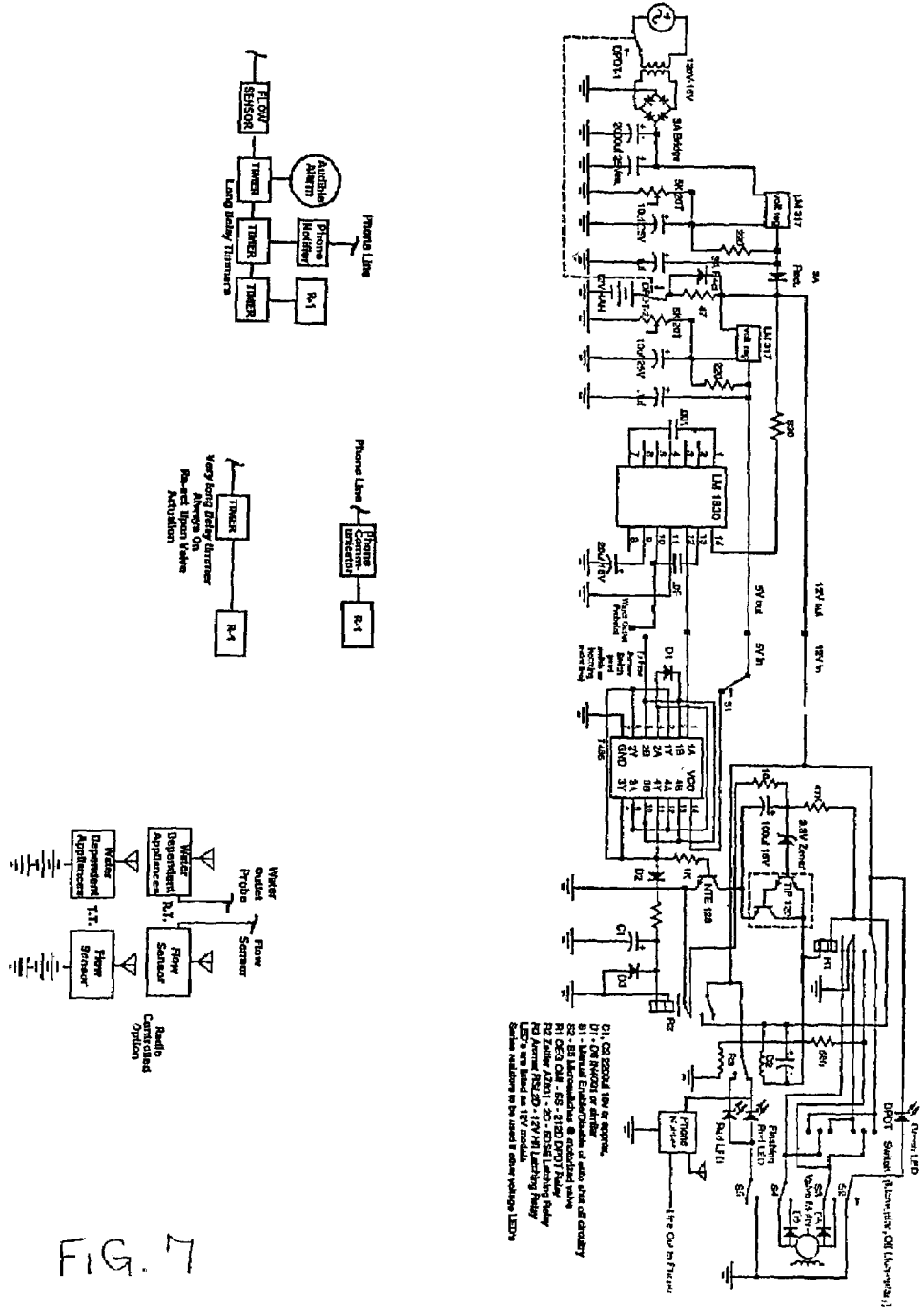
FIG. 7 is a schematic of the circuitry of the invention.

As previously observed, provided herein is a system for closing a valve to shut off a pressurized conductive fluid supply in the event of a pressurized conductive fluid leak. This system is shown in FIG. 1 though FIG. 7.

Figure 1:
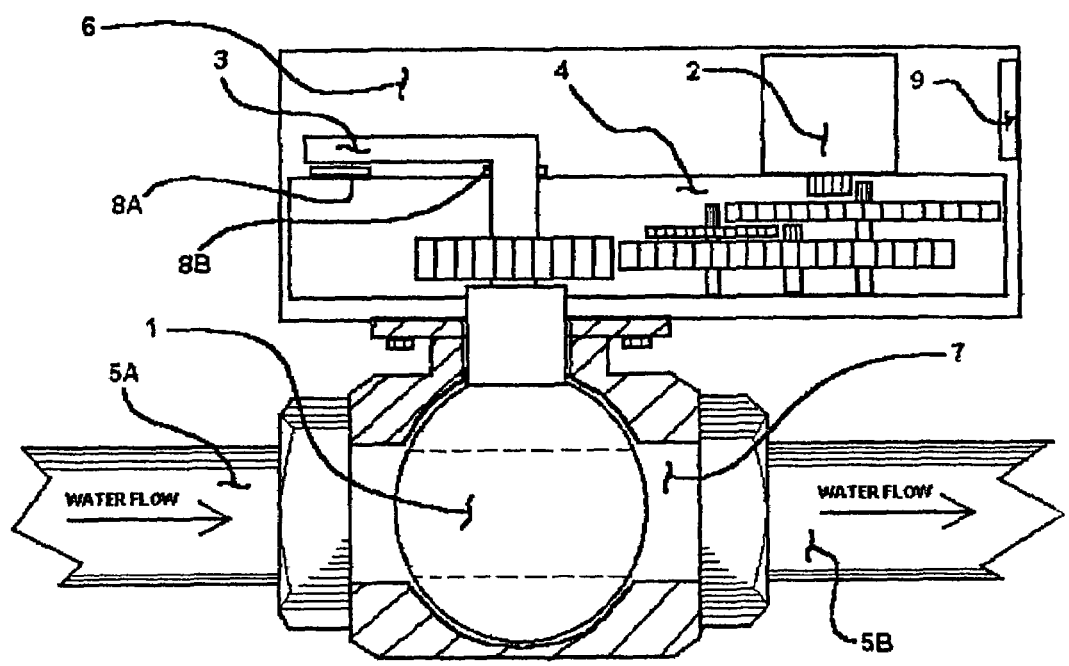
FIG. 1 is a cross-sectional view of the DC powered automatic shut-off ball valve.
Figure 2:
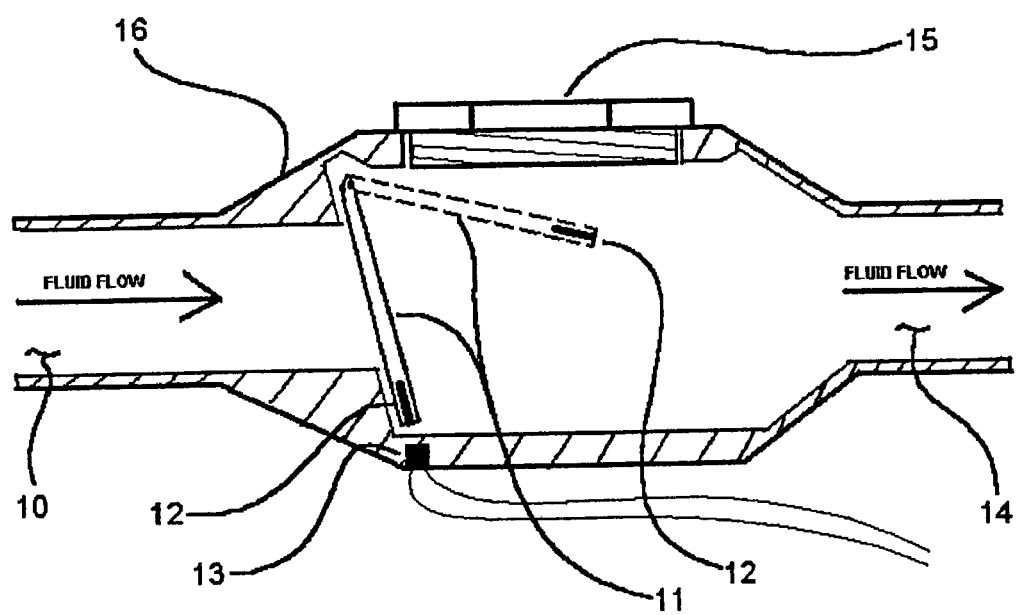
FIG. 2 is a cross-sectional view of the Back flow preventing flow sensing unit.
Figure 3:
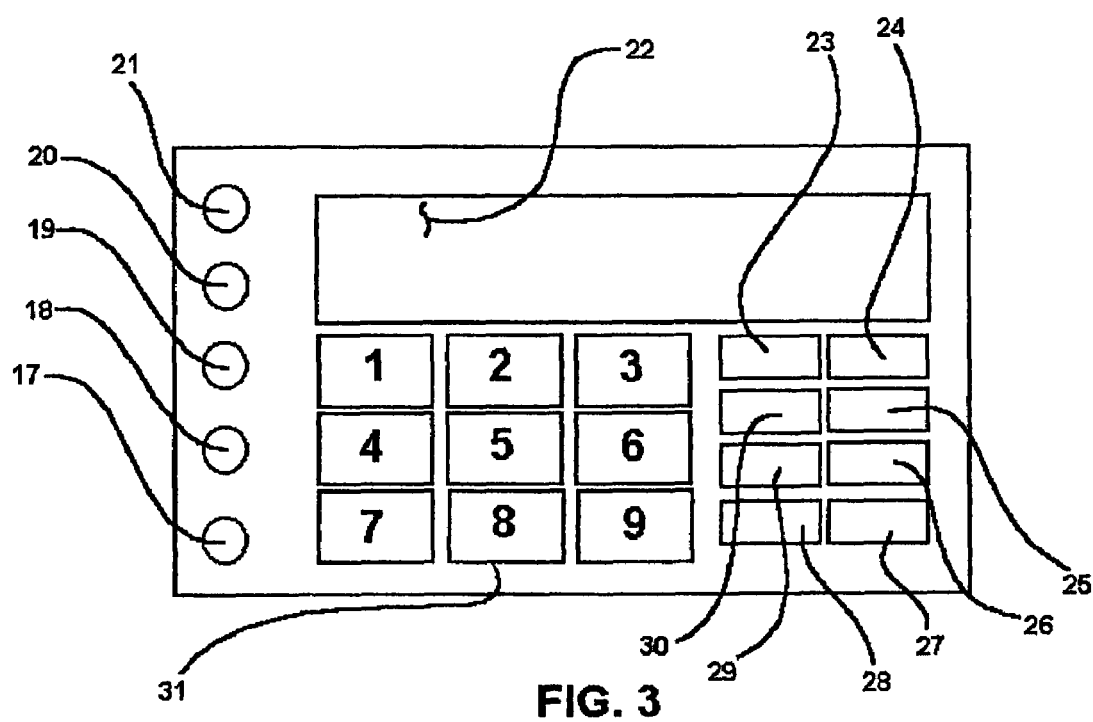
FIG. 3 is a front view of the main control panel for the system.
Figure 6:
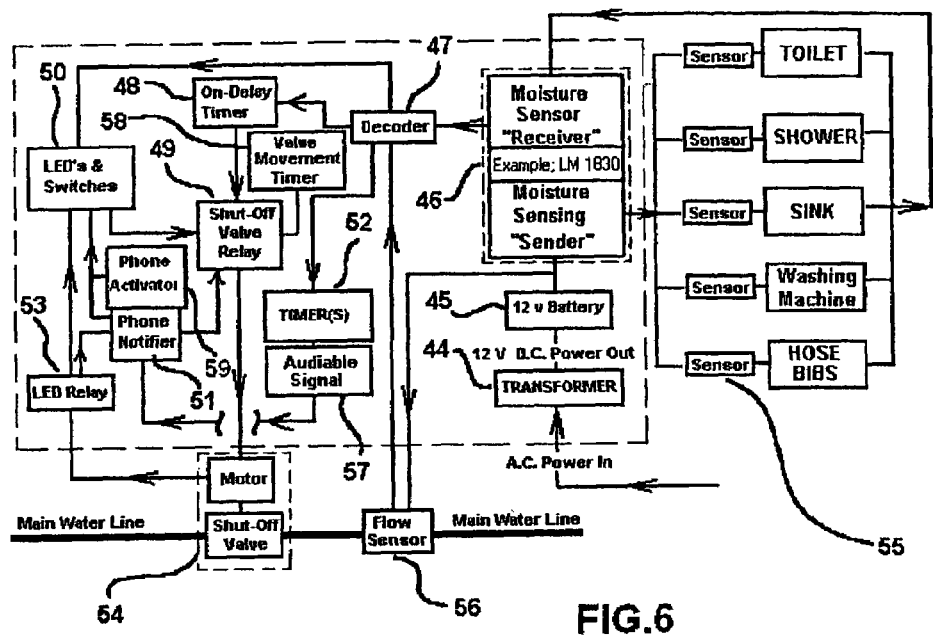
FIG. 6 is a block diagram illustrating the overall electrical system of the invention.

1) Automated System On, a Leak Detected and Auto Shut Down . . . ,

When water passes through the inlet 5A, as shown in FIG. 1 and continues through the ball 1 of the main water valve, of the 12 volt DC powered motor 2 located in the waterproof control cover 6 of the automatic shut-off valve, which is in an open position, and the lever 3 is activating switch(s) 8A which switches polarity on the DC motor 2, (to an open state) as well as illuminates on the control panel, the green LED 21 as shown in FIG. 3, by way of electrical connecting wires connected to the 12 volt input 9 located on the side of the waterproof control cover 6. The water then continues through the outlet 5B and on to the inlet 10 of the flow sensing device, as shown in FIG. 2 or in-line flapper valve, (which also includes a clean out access hole 15) which forces the pivotal valve flap member 11 forwards having attached thereto a magnet 12 away from the casing 16 and the magnetically responsive switch 13 which switches states when the magnet is moved from a first position to a second position by forces exerted by flowing water. The circuitry is continuously receiving AC power to its transformer 44, as shown in FIG. 6, which turns the AC power into 12 volt DC power, and continuously charges the 12 volt battery 45. This DC voltage powers the flow sensing device, or in-line flapper valve 56 as well as the monolithic bipolar integrated circuit designed for use in fluid detection 46, which passes an AC signal through the entire water supply pipe system, shown in FIG. 4, which includes the inlet 32A of the water dependent faucet, which is connected to the main water supply line. If the water flows through the inlet 5A and the ball 1, as shown in FIG. 1 (which is in a open position) of the main water shut off valve and through the outlet 5B and on to the inlet of the water flow detector 10, and pivotal flapper valve 11, shown in FIG. 2 which forces the pivotal valve flap member 11, that is hinged to the casing 16, forwards having attached thereto a magnet 12 away from the magnetically responsive switch 13 which switches states when the magnet is moved from a first position to a second position by forces exerted by flowing water. The water continues through the outlet 14, as the magnetically responsive switch 13 sends a signal to the decoder 47, as shown in FIG. 6, telling it that water is flowing. The signal continues to the on-delay timer 48, which begins the count down from its predetermined set time, if water does not pass through one of the sensors 55, on the water dependent appliances:

EXAMPLE 1

Figure 4:
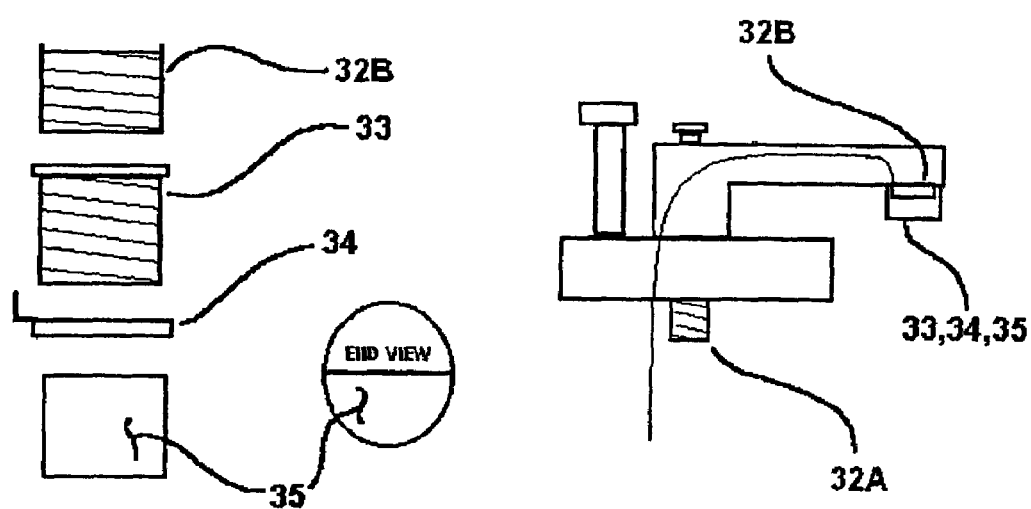
FIG. 4 is a parts view of the End of a water dependent appliance moisture sensing unit.

Thereby passing through the faucet's inlet 32A, as shown in FIG. 4 and on through to the faucet's outlet 32B, and through the isolating adapter 33, which holds the aerator, and isolates the main water supply line from the corrosive resistant, conductive connecting washer 34, which is designed to slide over the isolator 33, having an AC signal attached to it, and to remain in place, and the corrosive resistant conductive end cap 35 which is designed to be removed and replaced, by way of threaded connection to the isolator 33 without disconnecting the AC signal that is connected to corrosive resistant conductive connecting washer 34, because the corrosive resistant conductive end cap 35 holds the clean out screen for easy screen clean out. When screwed on tightly, it makes contact with the corrosive resistant, conductive connecting washer 34, also making the corrosive resistant, conductive end cap 35 connected to the AC signal. It also incorporates a cross sectional member 35 for insurance that water cannot pass through it without touching the sides, or the cross sectional member for assurances that there will be no miss-readings. So when water passes through the corrosive resistant conductive end cap 35, it will use the main water supply line 32A and the corrosive resistant conductive end cap 35 as two probes, then the 12 detector 47, as shown in FIG. 6, determines the presence or absence of the fluid between the 13 probes with the resistance internal to the integrated circuit.

Figure 5:
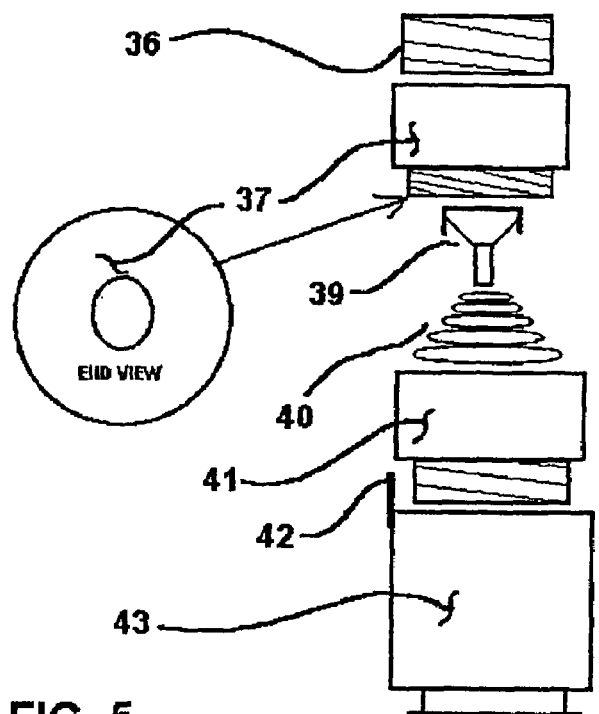
FIG. 5 is a parts view of the main in-line and or end moisture sensing unit for the shower, toilet, faucets, dishwasher, hose bib, etc.
Figure 5:
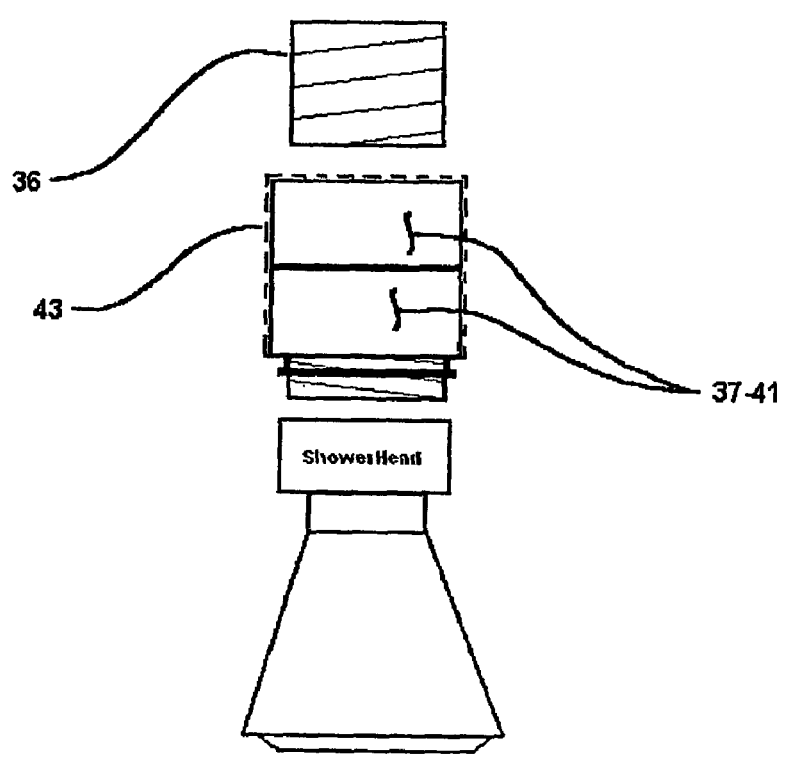

Example 2; thereby passing through the shower head sensors inlet 36, as shown in FIG. 5 which is also connected to the AC signal running through the main water supply line therefore also sending the AC signal through it, and on through the non-conductive isolator 37, as shown in FIG. 5, which has a water chamber, and a water escape hole, which is blocked by the non conductive water stop 39, which is held into place with a spring 40, thereby stopping the water from moving forwards through the escape hole of the non conductive isolator 37 when the water is not being requested from that location. If water is being requested from that location, (shower head) then the water would force the water stop 39 forwards, thereby allowing water to escape from the first non conductive isolator 36, and into the second non conductive isolator 41, which has a conductive sleeve 43 that slides over the second non conductive isolator 41, and is also connected to the AC signal with its probe 42. The water would then go on through the showerhead, and onto the waste pipe. When the corrosion resistant conductive cover 43, has been slid over the second non conductive isolator 41, and the conductive shower head is screwed up tight onto the end of the second non conductive isolator 41, it also makes contact with the flat end of the corrosion resistant conductive cover 43, which is also connected with an AC signal with its probe 42, thereby making the shower head one of the two probes, and also connecting the conductive showerhead to the AC signal. When water now passes through the showerhead, it actually becomes part of our water sensor. By using the inlet 36 of the showerhead sensor, and the showerhead itself (being connected to the flat end of the AC signal connected 42, corrosion resistant conductive cover 43) as the two probes, the detector will determines the presence or absence of the fluid between the two probes with the resistance internal to the integrated circuit.

If water does not pass, in example 1, through the two so called probes 32A and 35 as shown in FIG. 4, and in example 2, through the so called probes 36 and 43 as shown in FIG. 5 (including the shower head) then the connection will not be made, thereby not sending a signal to the decoder 47, as shown in FIG. 6. The on-delay timer 48 would then time out, and in turn send power to the shut off valve relay 49, the phone notifier 51, and the audible signal 57, at the same time. When the shut off valve relay 49 receives power, it sends the power to the main water valve 54 power connection 9, as shown in FIG. 1, which in turn turns the main water valve 54 as shown in FIG. 6, to the closed position, via the 12 volt DC motor 2, as shown in FIG. 1, and the gear box 4, in turn turning the ball 1 from a open position to a closed position in its valve casing 7, in turn terminating the water supply to the building or house, which also changes the position of the lever 3, from activating the open switch 8A to activating the closed switch 8B. This in turn prompts power to be sent to the, LED relay 53, as shown in FIG. 6, to send power to the control panel 50 and illuminates the red flashing LED 18, as shown in FIG. 3, and illuminates the visual screen 22, to indicate the status of the system. When the phone notifier 51 as shown in FIG. 6, receives power, it notifies the user by telephonic communication, with the user set number set in the control panel shown in FIG. 3, that there was a leak detected, and the system was automatically shut down. When the audible signal 57, as shown in FIG. 6, receives power, it starts to beep continuously until the system is reset by the reset button 27, as shown in FIG. 3.

2) Automated System On, with No Request for Water and No Leak Detected;

The pressurized conductive fluid control system of the present invention installed, for example; A water system in a home or building, in a automated system on mode, and no water is being requested, one sees that the main incoming water inlet 5A, as seen in FIG. 1, which is typically pressurized, would allow water to be pass through the ball 1 of the DC powered motor 2 automatic shut-off valve, which is in an open position, and lever 3 is activating switch 8A which switches polarity on the DC motor 2, (to an open state) if the water is not in motion (i.e. water is not being requested and or no leak is detected in the main water supply line) then the water flow detector, or in line flapper valve's pivotal valve flap member 11, as shown in FIG. 2, has remained in its home or seated position, or seated upon the casing 16, keeping the magnetically responsive switch 13 in its normally closed position. This also illuminates on the control panel, the green LED 21, as shown in FIG. 3, which lets the user know that the automated system is on and no leak is detected.

3) Automated System On, and a Request for Water and No Leak Detected;

When one or more of the water dependent appliances in FIG. 6, is requesting water, which are equipped with a water sensor 55 installed in each one. Water then starts to move 8 forwards in the main water supply line into the inlet 5A as shown in FIG. 1, of the main 9 water valve. When it passes through the ball 1 and on through to the, inlet 10, of the flow sensing device, or in line flapper valve as shown in FIG. 2, which forces the pivotal valve flap member 11 forwards having attached thereto a magnet 12 away from the magnetically responsive switch 13 which switches states when the magnet is moved from a first position to a second position by forces exerted by flowing water. At which point the decoder 47 as shown in FIG. 6, receives the signal from the magnetically responsive switch 13 as shown in FIG. 2, telling it that water is in motion. The decoder 47, as shown in FIG. 6, awaits a predetermined amount of time from the on delay timer 48 for a signal from one or more of the moisture sensors 55 installed in the water dependent appliances. When receiving a signal from one or more of the water sensors 55 located on the water dependent appliances, it neutralizes the decoder 47 from sending power to the shut off relay 49 and shutting off the main water valve 54 ultimately keeping the green LED 21 as shown in FIG. 3, illuminating and the water supply to the home or building on and pressurized.

4) Water is Running, No Leak Detected, Water Conservation Timer;

This system works the same as in # 3. Automated system on request for water and no leak detected, but for example a hose bib (which also has a water sensor in it or attached to it) has pressurized a garden hose for the purposes of watering plants, grass or washing a automobile etc, has been forgotten and left in the on position. If the pressure in the garden hose builds up so great as to create a split or leak in the hose, then water would be running for a undesirable over extended period of time, not only running up the water cost of the home or building, but also wasting an enormous amount of water. When the water is in use in or around the home or building, this prompts a timer 52, as shown in FIG. 6, that is user set 31 determined amount of time, as shown in FIG. 3; that starts a count down (example 60 minutes). When, the timer 52, as shown in FIG. 6, reaches zero, it prompts a solid audible signal 57 to start, to warn the present user (in the home or building) of the extended water usage. When the solid audible signal 57 starts, it can be reset 27, as shown in FIG. 3, to restart its counting over again if the extended water usage is desired, or if the water usage is terminated for any reason, it will automatically stop signaling, and wait until the water is in use again to re-prompt the timer. If the water on timer 52, as shown in FIG. 6, times out, and activates the audible signal 57, it prompts another timing mode 52 to activate. If the excessive water usage are not terminated, or it is not reset by way of the reset button 27, as shown in FIG. 3, then after a user set time 31, as shown in FIG. 3 (example, another 20–30 minutes past the audible signal 57) being activated, as shown in FIG. 6) the phone notifier 51, as shown in FIG. 6, will automatically notify the user with a user set number 31, stored in the control panel, as shown in FIG. 3, by way of telephonic communication anywhere in the world, of the excessive water usage. The user then has the option to turn the main water valve 56, as shown in FIG. 6, off manually by way of telephonic communication 59. If the user does in fact option to manually turn the water supply off by way of telephonic communication 59, using a user set code 31, stored in the control panel, as shown in FIG. 3, then this will send power to the shut off valve relay 49, and to the main water valve 54, on to the power connection 9, as shown in FIG. 1, which in turn turns the main water valve 54, as shown in FIG. 6, to the closed position via the 12 volt DC motor 2, as shown in FIG. 1, and the gear box 4, in turn turning ball 1 from an open position to a closed position in its valve casing 7, intern terminating the water supply to the building or house, which also changes the position of lever 3 as shown in FIG. 1, from activating the open switch 8A to activating the closed switch 8B. This in turn prompts power to be sent to the LED relay 53, as shown in FIG. 6, to send power to the control panel 50, illuminates the solid yellow LED 20, as shown in FIG. 3, and the solid red LED 19 simultaneously and illuminates the visual screen 22 to indicate the status of the system being shut down.

If the user does not reset the system by way of the reset button 27, as shown in FIG. 3, manually terminating the water usage, or by way of telephonic communication 59, as shown in FIG. 6, then another timing 52 period will prompt after the telephonic communication 51 was prompted and the reset button was not reset by using the reset button, by telephonic communication, or manually shutting off the water supply. When this timing 52 period 21 (example another 10–15 minutes) has timed out, it will automatically send power to the shut 22 off valve relay 49, and to the main water valve 54 via the power connection 9, as shown in FIG. 1, which in turn turns the main water valve 54, as shown in FIG. 6, to the closed position via the 12 volt DC motor 2, as shown in FIG. 1, and the gear box 4, in turn turning ball 1 from an open position to a closed position in its valve casing 7, in turn terminating the water supply to the building or house. Which also changes the position of the lever 3, as shown in FIG. 1, from activating the open switch 8A to activating the closed switch 8B. This in turn prompts power to be sent to the LED relay 53, as shown in FIG. 6, to send power to the control panel 50 illuminating the solid red LED 19, as shown In FIG. 3 and the solid yellow LED 20 simultaneously, as well as illuminating the visual screen 22 to indicate the status of the system. When the phone notifier 51, as shown in FIG. 6, receives power, it notifies the user by telephonic communication with a user set number stored in the control panel, as shown in FIG. 3, that there was excessive water usage, and the system was automatically shut down.

5) Keeping the Main Water Shut Off Valve Moving Freely;

The enclosed invention also has a preset timing period 58, built in to the system, as shown in FIG. 6. This timer 58 starts counting after the last main water shut off valve 54 movement has occurred, and automatically resets itself every time the main water shut off valve 54 is moved from an open to a closed position, or a closed to an open position. If the main water shut off valve 54 has not moved in a predetermined period of time (example 4–6 months) then the timer 58 will then time out, and automatically send power to the shut off valve relay 49, and to the main water valve power connection 9, as shown in FIG. 1, which in turn turns the main water valve to the closed position via the 12 volt DC motor 2, and the gear box 4, in turn turning ball 1 from an open position to a closed position in its valve casing 7, and then immediately re-open the main water shut off valve to its normal open position. The timer 58, as shown in FIG. 6, then will reset its self and start the timing cycle all over again. Reference numbers 17, 23, 24, 25, 26, 28, 29 and 30, as shown in FIG. 3 are optional LED's, buttons and or switches of the control panel, used for future additional options.

The invention claimed is:

1. A liquid leakage protective system for minimizing damage from liquid leakage by automatic shutoff upon early detection of the leakage anywhere in a pressurized pipeline network between an input end and a plurality of outlet devices each selected from a group including appliances, sink and tub faucets, shower heads, toilets, service taps and other liquid outlet devices, comprising:

an input flow detector, located in-line near the input end of the pipeline network, made and arranged to generate an "input flow" status signal whenever liquid flow into the pipeline exceeds a predetermined input flow threshold rate;

an outlet flow detector co-located integrally with each outlet device in the pipeline network, made and arranged to generate an "outlet flow" status signal whenever liquid flow through the co-located outlet device exceeds a predetermined outlet flow threshold rate;

a shut-off valve located at the inlet end of the pipeline, near said input flow detector, made and arranged (a) to be operable electrically in at least a unidirectional manner to transition from an open state to a closed state and thus shut off liquid flow to the pipeline network in response to a predetermined "close" electrical signal and (b) also to be operable manually in a bidirectional manner to transition between the open state and the closed state;

a central processing unit (CPU), made and arranged to receive and continuously monitor flow status signals from said input flow detector and from each of said outlet flow detectors, to detect leakage as indicated by an "input flow" signal in absence of any "outlet flow" signal, and, upon detecting leakage, to command said shut-off valve to close.

2. The liquid leakage protective system as defined in claim 1 wherein, to avoid erroneous shutoff by allowing time for stabilization of flow detection, leakage detection and pipeline network flow conditions upon each new event of input flow detection, said CPU comprises:
a timing circuit made and arranged to introduce at least one of the two following user-adjustable delay time periods: (a) a pre-detection time delay between an initial detection of an input flow event and CPU detection of leakage, and (b) a pre-shutoff time delay between CPU detection of leakage and automatic shut-off of said shut-off valve.

3. The liquid leakage protective system as defined in claim 2 wherein the pre-detection time delay and the pre-shutoff time delay are each made to be user-adjustable in a range between a 0.5 seconds and 2 minutes.

4. The liquid leakage protective system as defined in claim 2 wherein said input shut-off valve further comprises:
a D.C. electrical motor and associated coupling/speed-reduction mechanism, made and arranged to actuate said valve to transition from the open state to the closed state when said motor is energized with rated D.C. voltage of first polarity in response to an "off" signal from said CPU, and to actuate said valve to transition from the closed state to the open state when said motor is reverse-energized with rated D.C. voltage of a second polarity opposite the first polarity in response to an "on" signal from said CPU.

5. The liquid leakage protective system as defined in claim 1 wherein said outlet flow detector is made to have two electrical nodes: a common ground node and a signal node and is made and arranged to indicate presence/absence of liquid by a distinguishable voltage level sensed at the signal node by said CPU.

6. The liquid leakage protective system as defined in claim 5 wherein said input flow detector comprises:
a flapper-type check valve, connected in-line near the input end of the pipeline network, having a magnetically-transparent waterproof housing, and having a flapper made and arranged to rest against a valve seat in absence of liquid flow in a manner to prevent back-flow, and to move, at least in part, away from the valve seat in the event of forward liquid flow;
a permanent magnet attached to a selected region of the flapper; and
a magnetically-actuated switch, located on and attached to a selected external region of said check valve housing, made and arranged to sense flapper displacement and thus provide said CPU with an input signal indicating input flow status, i.e. flow/no-flow.

7. The liquid leakage protective system as defined in claim 6 wherein the liquid is conductive and wherein said outlet flow detector is implemented as a conductive liquid outlet flow detector associated with a corresponding one of said outlet devices.

8. The liquid leakage protective system as defined in claim 7 wherein said conductive liquid outlet flow detector is biased with an A.C. voltage in order to prevent electrolysis contamination.

9. The liquid leakage protective system as defined in claim 7 wherein said conductive liquid outlet flow detector comprises:
a first conductive probe region, disposed in a branch of the pipeline network in a flow path associated with an outlet device, made and arranged to remain in contact with conductive liquid in the pipeline network and thus constitute the common ground node; and
a second conductive probe region, disposed downstream from said first conductive probe region, made and arranged to be electrically insulated from the common ground node in absence of liquid flow, to make electrical contact with the conductive liquid and thus with the common ground node in event of outlet flow, and to thus constitute the signal node.

10. The liquid leakage protective system as defined in claim 9 wherein said conductive liquid outlet flow detector is located in an associated outlet device of a type having a liquid exit region that is directed in a generally downward direction such that said second conductive probe region is inherently self-draining in absence of outlet flow, with minimum residual moisture that could otherwise cause false flow detection and erroneous shut-off, said conductive liquid outlet flow detector comprising:
a non-metal pipe section of electrically-insulating material having an upstream end attached in a watertight manner to the liquid exit region of said outlet device, which is made and arranged to serve as said first conductive probe region constituting the common ground node; and
an electrically-conductive liquid-flow-detecting element, located in a downstream region at a second and opposite end of said non-metal pipe section and thus electrically insulated from the discharge endpoint, made and arranged to serve as said second conductive probe region constituting the signal node.

11. The liquid leakage protective system as defined in claim 9 further comprising:
an electrically non-conductive check valve disposed transversely as a water-tight bulkhead in the flow path between said first conductive probe region and the second conductive probe region of said conductive liquid outlet flow detector, configured with a central flow opening surrounded by a flat valve seat on a downstream side of said bulkhead; and
a non-conductive valve stopper urged against the seat region in a spring-loaded manner that, in absence of outlet flow, remains closed and thus provides electrical insulation between said first conductive probe region and the second conductive probe region, and that, in presence of outlet flow, causes said valve stopper to open and allow downstream liquid flow, wherein electrical contact between the two conductive probe regions and thus between the two nodes via the conductive liquid generates an "outlet flow" signal that is communicated to said CPU.

12. The liquid leakage protective system as defined in claim 11 wherein the outlet device is a shower head, threadedly removed from normal threaded connection via external threads on a shower pipe, said conductive liquid outlet flow detector comprising:
a primary internally-threaded annular insulating sleeve having an upstream end threadedly engaging the external threads on the shower pipe, forming a water chamber and providing a relatively small central water flow opening and valve seat at an opposite downstream end;
a spring-loaded non-conductive stopper disk bearing against the valve seat at the downstream end of said primary insulating sleeve to minimize after-shower residual liquid release and to provide necessary electrical isolation;

a secondary non-conductive annular insulating sleeve configured at an upstream end with an annular collar extending outwardly and threaded internally to engage said primary insulating sleeve; and threaded externally at a downstream and opposite end to engage the showerhead;

a conductive sleeve surrounding said secondary insulating sleeve, and having a downstream end electrically contacting the showerhead; and an insulated wire electrically connected to said conductive sleeve constituting the signal node and forming at least a portion of a communication link to said CPU.

13. The liquid leakage protective system as defined in claim 1 wherein the pipeline network is of metal at least in part and is connected to the common ground node, and wherein the pipeline network may be utilized to constitute some portion of a common ground return path for electrical and electronic components of said liquid leakage protective system.

14. The liquid leakage protective system as defined in claim 1 further comprising, in said CPU, an on-timer made and arranged to enable said CPU to monitor flow time periods, to determine therefrom unintended excessive flow from any outlet device beyond a user-set limit, to automatically initiate an alarm and then, in failure of timely attention by the user, to close said shut-off valve.

15. The liquid leakage protective system as defined in claim 1 further comprising:

a set of D.C. power lines and terminals made and arranged to enable a storage battery to power electrical and electronic components of said liquid leakage protective system; and an AC power supply made and arranged to operate from a regular AC power system to provide D.C. power to operate said liquid leakage protective system.

16. The liquid leakage protective system as defined in claim 1 further comprising:

a central control panel associated with said CPU;

a display region, including distinctive colored LEDs located on said central control panel, made and arranged to inform the user regarding status of the pipeline network activation buttons.

17. The liquid leakage protective system as defined in claim 16 further comprising:

a plurality of user controls on said central control panel made and arranged to activate desired functions of the said liquid leakage protective system;

an alpha-numeric readout display on said central control panel, driven from said CPU, made and arranged to display data regarding said liquid leakage protective system including the pipeline network and said on-delay timer.

18. The liquid leakage protective system as defined in claim 17 wherein said alarm means comprises an audible signal generator made and arranged to generate a distinctive audible warning signal when said CPU has determined occurrence of liquid leakage and performed shut-off of the input shut-off valve.

19. The liquid leakage protective system as defined in claim 18 where said alarm system comprises phone notifier means associated with said CPU made and arranged to enable a user to enter a phone number and subsequently, when said CPU has determined the occurrence of liquid leakage and performed shut-off of the input shut-off valve, to dial the entered phone number and, upon response, to provide an alarm message to the user.

20. The liquid leakage protective system as defined in claim 19 where said alarm system is further made and arranged to sound an audible alarm for a predetermined time period in event of detection of excessive liquid flow, then in absence of response, to notify the user by phone whereby the user is enabled to initiate shut-off, then in absence of timely response, to automatically perform shut-off of the input shut-off valve, with distinctive indication of the cause of shutoff being provided on said control panel.

* * * * *

UNITED STATES PATENT AND TRADEMARK OFFICE
CERTIFICATE OF CORRECTION

PATENT NO. : 7,032,435 B2
APPLICATION NO. : 10/243778
DATED : April 25, 2006
INVENTOR(S) : Brian Edward Hassenflug It is certified that error appears in the above-identified patent and that said Letters Patent is hereby corrected as shown below:

In the specificstion: delete/disregard 28 occurences of the term "conductive" at the following locations:
Col. 1, lines 12, 13
Col. 5, lines 10, 35, 42, 43, 46, 49, 50, 52, 56, 57, 60, 61, 64
Col. 6, lines 1, 4, 32, 37
Col. 7, lines 21, 44, 45
Col. 8, lines 27, 32, 64
Col. 10, lines 5, 6
Col. 12, line 15

Item [57]
In the abstract: delete/disregard 5 occurrences of the term "conductive" at lines 1, 4, 5 and (2 occurrences) 7.

Signed and Sealed this

Sixth Day of March, 2007

JON W. DUDAS
*Director of the United States Patent and Trademark Office*